May 21, 1968 H. S. BELL, JR 3,383,861
REVERSE THRUST CONTROL FOR ROCKET ENGINE
Filed Dec. 13, 1965 3 Sheets-Sheet 1
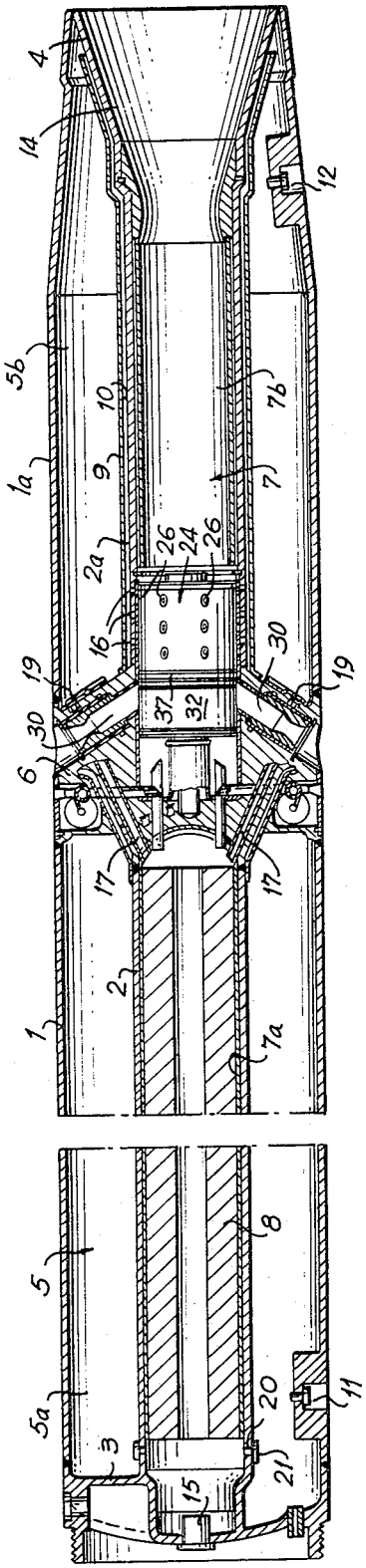
INVENTOR.
HAROLD S. BELL, Jr.
BY Curtis, Morris & Safford
ATTORNEYS

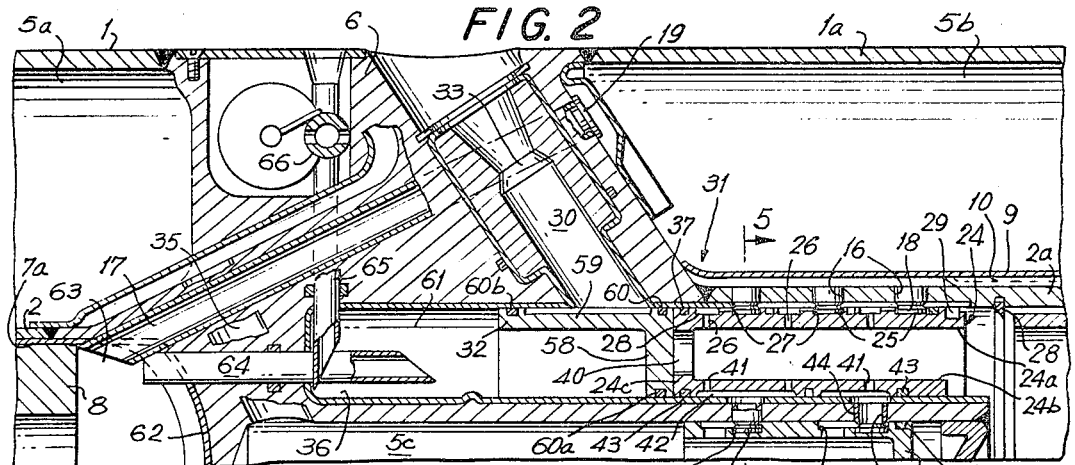
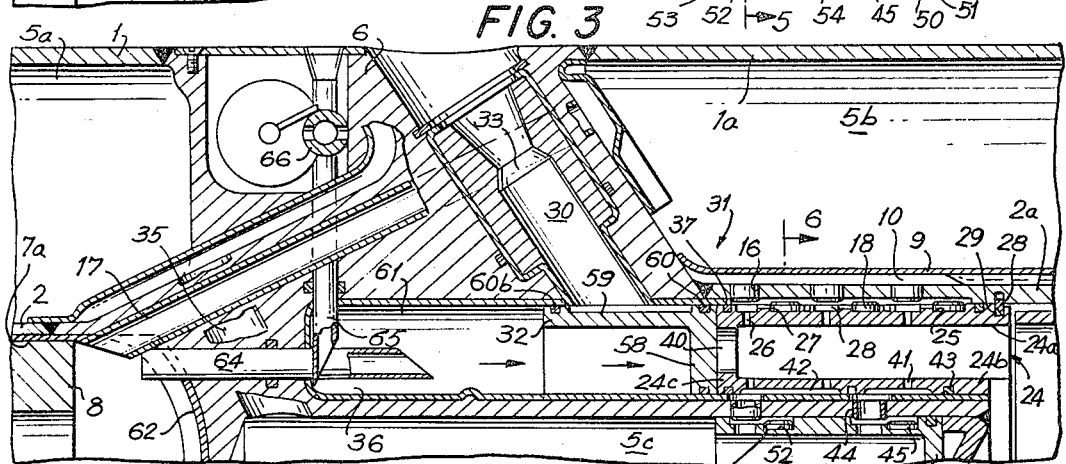
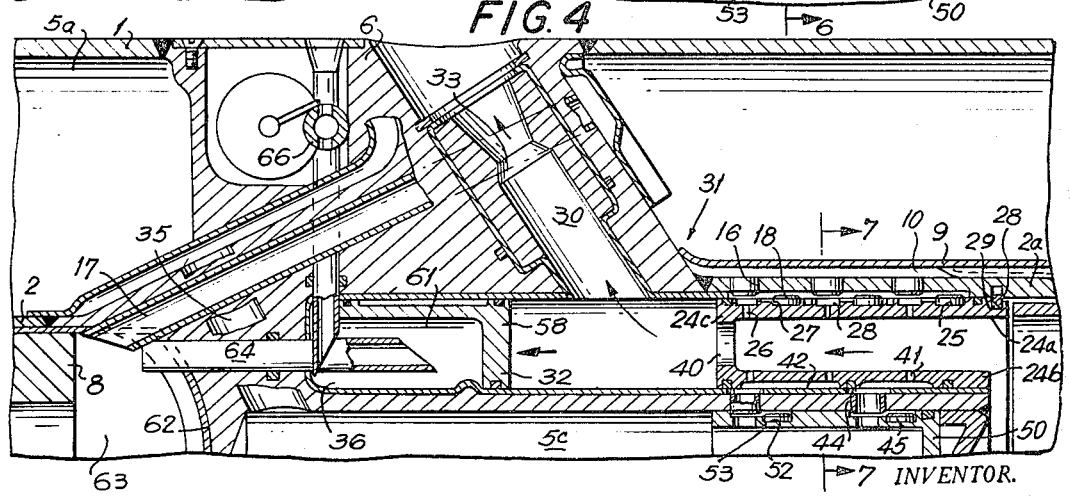

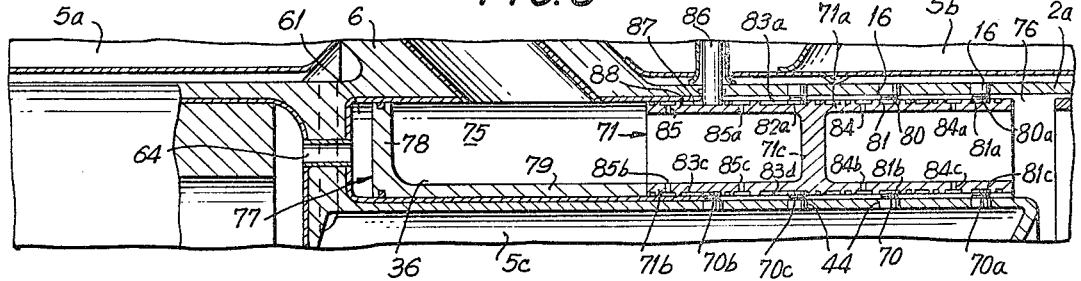
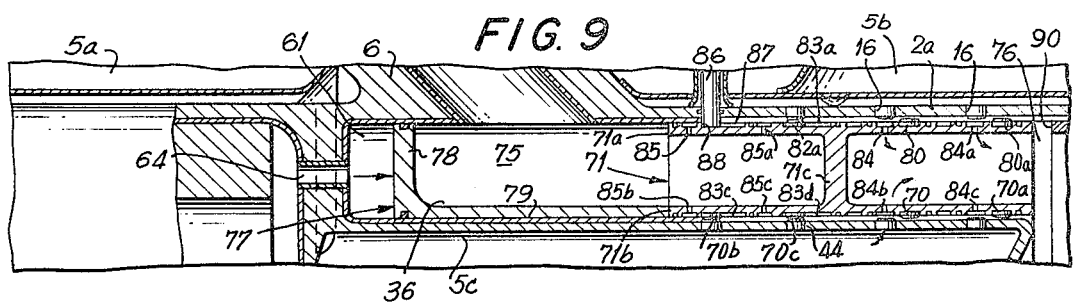
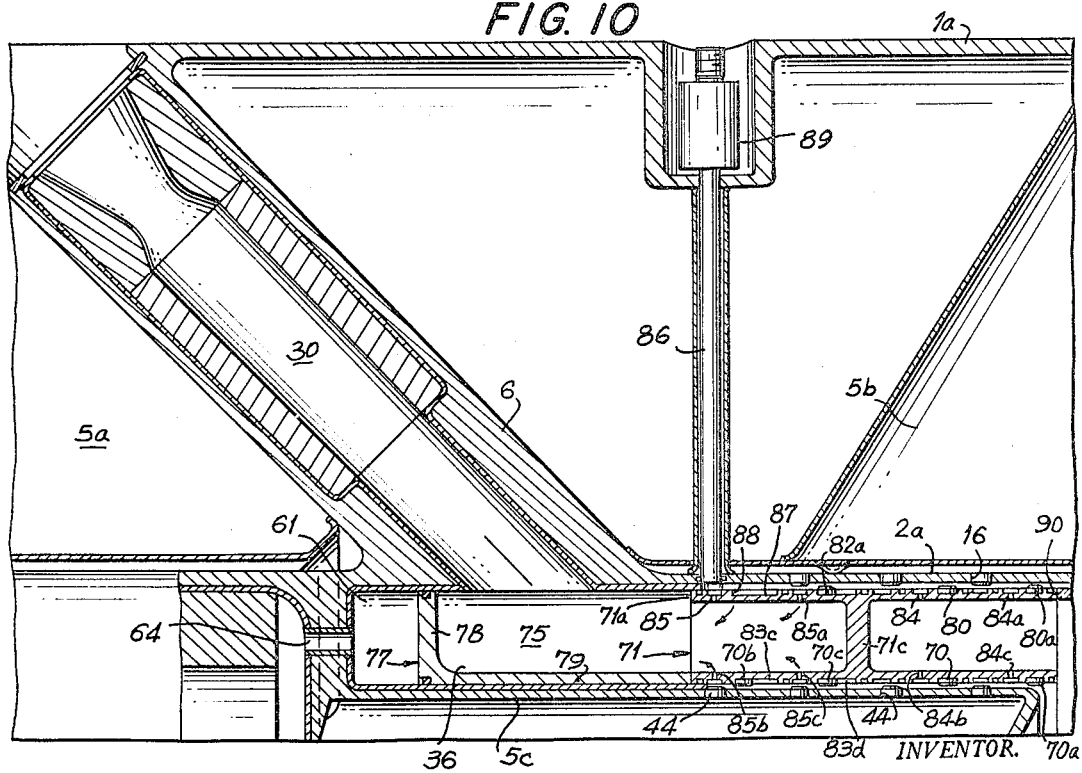
INVENTOR.
HAROLD S. BELL, Jr.
BY
Curtis, Morris & Safford
ATTORNEYS

United States Patent Office 3,383,861
Patented May 21, 1968

3,383,861
REVERSE THRUST CONTROL FOR ROCKET ENGINE
Harold S. Bell, Jr., Madison, N.J., assignor to Thiokol Chemical Corporation, Bristol, Pa., a corporation of Delaware
Filed Dec. 13, 1965, Ser. No. 513,382
10 Claims. (Cl. 60—229)

ABSTRACT OF THE DISCLOSURE

Application discloses an arrangement for reversing the direction of thrust on a rocket engine comprising a slide valve for initiating flow of bi-propellant liquids to a combustion chamber and a control means cooperating with the slide valve to selectively deliver products of combustion to rearwardly and forwardly projecting nozzles.

---

The present invention relates to rocket engines and more particularly to controlling the exhaust of combustion gases through forward and reverse thrust nozzles.

In multi-stage missiles positive separation of successive stages is often required to avoid post separation impact. Such positive stage separation can be accomplished by providing reverse thrust nozzles in the propulsion unit for the initial stage to produce a deceleration of said stage. In prior art constructions such reverse thrust nozzles are normally closed by a plug or cover and opened by means of an explosive for removing the plug or cover.

One of the objects of the present invention is to provide an improved control mechanism which is operable in response to a signal for directing the products of combustion from a combustion chamber through a reverse thrust nozzle.

Another object is to utilize the pressure of products of combustion generated in a chamber of a rocket engine to operate a valve mechanism for reversing the thrust on said engine.

Still another object is to provide an apparatus for controlling the flow of gas through separate nozzles to produce a forward or reverse thrust as required which is of simple and compact construction and relatively economical to manufacture.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a longitudinal sectional view through a rocket engine incorporating the novel features of the present invention and showing the relationship of the elements;

FIGURE 2 is an enlarged sectional view of a portion of the rocket engine illustrated in FIGURE 1 to show the reverse thrust nozzle and mechanism for controlling the exhaust of combustion gas therethrough;

FIGURE 3 is a view similar to FIGURE 2 showing the slide valves actuated by the pressure produced by a burning grain of solid propellant for delivering liquid fuel and oxidizer to a combustion chamber;

FIGURE 4 is a view similar to FIGURE 3 showing the piston actuated by a difference in pressure to uncover the reverse thrust nozzle;

FIGURE 5 is a transverse sectional view taken on line 5—5 of FIGURE 2 to show the cups which seal outlet passages from the tanks projecting into recesses in the slide valve prior to ignition;

FIGURE 6 is a transverse sectional view taken on line 6—6 of FIGURE 3 to show the sealing cups sheared by the slide valve when it is moved rearwardly to the position illustrated in FIGURE 3;

FIGURE 7 is a transverse sectional view taken on line 7—7 of FIGURE 4 to show the passages in the slide valve aligned with passages in the tanks for delivering liquid fuel and oxidizer to the combustion chamber;

FIGURE 8 is an enlarged view of a control apparatus of modified construction showing the slide valve in the form of a piston dividing the combustion chamber into forward and rearward sections;

FIGURE 9 is a view similar to FIGURE 8 showing the slide valve operated to one position to supply liquid fuel and oxidizer to the rearward section of the combustion chamber; and FIGURE 10 is a view showing the slide valve operated to another position where it closes the passages to the rearward section on the combustion chamber and opens passages to the forward section of the combustion chamber.

While the present invention may have other applications, it is shown applied to a packaged type liquid propellant rocket engine generally similar to that shown and described in the United States Letters Patent 3,094,837 issued to A. Sherman on June 25, 1963. This type of rocket engine comprises a casing having outer peripheral wall sections 1 and 1a and inner peripheral wall sections 2 and 2a with forward and aft end walls 3 and 4 to define an annular space 5 therebetween. A transverse bulkhead 6 is provided between the outer and inner, forward and rearward walls 1, 1a and 2, 2a to divide the annular space 5 into a forward tank section 5a for liquid oxidizer and an aft tank section 5b for liquid fuel. Bulkhead 6 also divides the cylindrical space 7 defined by the inner wall sections 2 and 2a into a forward chamber 7a containing a solid propellant grain 8 and a combustion chamber 7b for liquid oxidizer and propellant. A wall 9 is provided in the aft tank section 5b which is spaced outwardly from the inner wall section 2a and extends from the bulkhead 6 rearwardly. Wall 9 forms a passageway 10 through which all of the fuel flows from tank section 5b to cool the wall of the combustion chamber 7b.

Suitable oxidizer and propellant fuel in the tank sections 5a and 5b are inhibited red fuming nitric acid (IRFNA) containing approximately 18–23% NO$_2$ and unsymmetrical dimethyl hydrazene (UDMH), respectively. The tank sections 5a and 5b are provided with openings 11 and 12, respectively, which are hermetically sealed after each tank section is filled with its respective liquid. An exit cone or nozzle 14 is provided at the rearward end of the combustion chamber 7b and an igniter 15 closes the forward end of the chamber 7a for the grain 8 of solid propellant.

The inner wall section 2a has a plurality of axial rows of circumferentially spaced passages 16 adjacent the forward end of the rearward tank section 5b, see FIGURES 1 and 2, and the bulkhead 6 has a plurality of passages 17 leading from chamber 7a into the forward end of the rearward tank section 5b for pressurizing said tank. The passages 16 are closed by sealing cups 18 and the passages 17 are normally closed by sealing plugs 19. Similar passages 20 are provided in the wall 2 at the forward end of the forward tank section 5a which is sealed by a burst band 21 designed to withstand handling loads.

A slide valve 24 is provided having recesses 25 into which the shear cups 18 project during storage and rows of orifice passages 26 offset with respect to the recesses 25 longitudinally of the slide valve so that when the slide valve is moved rearwardly, knife edges 27 at the side of the recesses will shear the cups 18 to open the passages 16 and move the passages 26 into alignment therewith. The plurality of passages 26 in each row are connected by an annular groove 28 in the slide valve. The slide valve 24 is limited in its rearward movement and locked in the position illustrated in FIGURE 3 by a spring-press detent 28 having an inclined surface to permit the slide valve to move rearwardly and then engage a recess 29. As thus far described, the rocket engine is generally similar to that illustrated and described in the Sherman patent, referred to above.

In accordance with the present invention, at least one reverse thrust nozzle is provided together with mechanism including a piston for controlling the flow of combustion gases therethrough for producing a reverse thrust on the engine. In the embodiment of the invention illustrated in FIGURES 1 to 7, the reverse thrust nozzle is indicated by the reference character 30 and the control mechanism by 31 which includes a piston 32. Piston 32 cooperates with the slide valve 24 to initiate operation of the rocket engine to propel it forwardly and upon a signal controls the flow of combustion gases to the reverse thrust nozzles to at least partially reverse the thrust to decelerate the engine.

As shown in FIGURE 1, a plurality of reverse thrust nozzles 30 are provided in symmetrical arrangement around the periphery of the engine as, for example, 90° apart. These nozzles are located in the bulkhead 6, which is composed of an insulating material, and have their rearward ends opening into the central space 7 forwardly of the slide valve 24. Each of reverse thrust nozzles 30 is in the form of a cylindrical opening extending through the bulkhead 7 to the outer peripheral wall 1 of the casing. A throat 33, is located between its inner and outer ends, see FIGURES 1 and 2, and the axis of the nozzle extends at an angle of approximately 45° with the axis of the engine.

The control mechanism 31 comprises a cylindrical feed tube located axially in the space 7 and connected to the tank section 5a through a conduit 35 and, in effect, constitutes a cylindrical tank section 5c of smaller diameter than the tank section 5b to provide an annular space 36 therebetween. Slide valve 24 is of annular shape to fit in the annular space 36 with a running fit and has inner and outer walls 24a and 24b connected at the forward ends by a web 24c having axial openings 40 therein. The recesses 25 for the shear cups 18 are located in the outer periphery of the annular wall 24b as are the offset passages 26. As shown in FIGURE 2, the knife edges 27 formed by the forward edges of the recesses 25 shear the cups 18 when the slide valve 24 moves rearwardly and the grooves 28 connect all of the passages 26 of a row with passages 16 in the wall 2b of tank section 5b. Slide valve 24 is sealed to the inner wall 2a of the rocket engine casing by suitable O-rings 37.

The inner wall 24b of the slide valve 24 closely fits the outer periphery of the tank section 5c and has rows of radial passages 41 similar to the passage 26 in the wall 24a. Wall 24b also is provided with peripheral grooves 42 overlying the passages and extending longitudinally a distance at least equal to the movement of the slide valve 24. O-rings 43 on the inner periphery of wall 24b, similar to those in the wall 24a, seal the wall to the outer periphery of tank section 5c. The wall of the inner tank section 5c is provided with passages 44 closed and sealed by shear cups 45 projecting inwardly into the tank. The rearward end of the inner tank section 5c is closed by a piston 50 closely fitting the peripheral wall of the tank section and sealed thereto by O-rings 51. The piston 50 has annular recesses 52 into which the shear cups 45 extend. The forward edges of the recesses 52 form knife edges 53 for shearing the cups 45 when the piston moves rearwardly. The piston 50 also is provided with passages 54 which align with the passages 44 in the wall of the tank section when the piston is moved from the position illustrated in FIGURE 2 to that illustrated in FIGURE 3.

The control piston 32, referred to above, acts as a valve for opening and closing the reverse thrust nozzles 30. Piston 32 is mounted in the annular space 36 forwardly of the slide valve 24 to engage and actuate the latter from a storage position illustrated in FIGURE 2 to an operating position illustrated in FIGURE 3. The piston 32 has a head 58 extending across the annular space 36 adjacent the forward end of the slide valve 24 and a skirt 59 overlying the openings in the bulkhead 7 leading to the nozzles 30. Thus, the head 58 of piston 32 in one position engages the forward end of the slide valve 24 to close the openings 40 therein as illustrated in FIGURES 2 and 3, and the skirt 59 is of sufficient length to cover the reverse thrust nozzles 30. Sealing O-rings 60, 60a and 60b are provided on the inner and outer peripheries of the piston to seal the piston in the annular opening.

The inner peripheral wall 2a of the tank section 5b and the outer peripheral wall of the tank section 5c constituting the annular space 36 are connected by a radial wall 5d to form a chamber 61 forwardly of the piston 32. Chamber 61 is of such a length that when the piston 32 moves to its forward position illustrated in FIGURE 4 it uncovers the ports to the reverse thrust nozzles 30. Also, the inner annular space 7a forwardly of bulkhead 6 enclosing and containing the solid propellant grain 8 is closed by a transverse wall 62 to form a closed chamber 63 and the chambers 61 and 63 are connected by a conduit 64. Chamber 61 is also connected to the periphery of the rocket engine through a vent tube 65 normally closed by a valve 66 shown as a ball or sleeve type for purposes of illustration. Valve 66 may be actuated by any suitable mechanism which will respond to a signal, such as an electrically energized device for either directly actuating the valve or, ignite an explosive operating through a suitable linkage for actuating the valve. One form of the invention having now been described in detail, the mode of operation is next explained.

The rocket engine 1 as shown in FIGURE 1 is loaded with the grain of solid propellant and liquid fuel and oxidizer and then stored at a place where it is to be launched. When in storage, the elements are in the relative position illustrated in FIGURES 1 and 2. The rocket engine is initiated by actuating the igniter 15 at the forward end of casing, see FIGURE 1. The grain 8 of solid propellant burns when ignited and produces gas at high pressure. The gas under pressure then flows from chamber 63 through the conduit 64 into the chamber 61 at the rear of the piston 32, see FIGURE 2, and actuates the piston from the position illustrated in FIGURE 2 to that illustrated in FIGURE 3. This movement of the piston 32 is transmitted to the slide valve 24 which also moves to the position illustrated in FIGURE 3 where it is locked by the spring press detent 28. The rearward movement of the slide valve 24 shears the sealing cups 18 and aligns the passages 26 with the passages 16 in the wall 2a of tank 5b. The products of combustion from the solid propellant grain 8 also flow through the conduits 17 into the forward end of the tank section 5b to force the liquid fuel rearwardly and then forwardly through the cooling passages 10 and aligned passages 16 and 26 into the spaces between the inner and outer walls 24a and 24b of the slide valve 24 forming a part of the combustion chamber.

Simultaneously, the pressure in the chamber 63 bursts the band 21, see FIGURE 1, to deliver the gaseous combustion products into the forward tank section 5a which acts as a propellant to force liquid oxidizer through the conduits 35 into the feed tube forming the tank section 5c. The pressure of the fluid in the tank section 5c actuates the piston 50 rearwardly which shears the cups 45 and move the passages 54 therein into alignment with the passages 44 in the wall of the tank section and passages 41 in the slide valve 24 to deliver the oxidizer into the combustion chamber. The contact of the oxidizer with the fuel produces a hypergolic reaction to burn the fuel and produce a pressure in the combustion chamber. The products of combustion then exhaust through nozzle 14 and result in a difference in pressure acting on the forward and rearward walls of the combustion chamber to produce a forward thrust on the engine. During such operation, head 58 of piston 32 is held in contact with the forward end of the slide valve 24 by the pressure of propellant gas from the solid grain 8 in chamber 63 and the skirt 59 overlies the ports to the reverse thrust nozzles 30.

The rocket engine continues to be propelled forwardly until it is to be decelerated. Upon the delivery of a signal, the valve 66 is actuated to open position illustrated in FIGURE 4. When the valve 66 opens it releases the products of combustion in the chamber 61 and thereby reduces the pressure therein below that in the combustion chamber. This difference in pressure acting on the head 58 of the piston 32 actuates it forwardly to the position shown in FIGURE 4 to uncover the ports to the reverse thrust nozzles 30. The products of combustion then flow from the combustion chamber through the axial openings 40 in slide valve 24 and exhaust through the reverse thrust nozzles 30. The area of the reverse thrust nozzles 30 are designed relative to the main nozzle 14 to produce a reverse thrust on the engine to cause it to decelerate.

A reverse thrust control mechanism of modified construction is illustrated in FIGURES 8 to 10 of the drawings. In this construction the tank sections 5a and 5b and bulkhead 6 are substantially the same as described with respect to the rocket engine illustrated in FIGURES 1 to 4. The axial tank section 5c, however, does not contain a piston 50, and the sealing shear cups 70 for the passages 44 project radially outward into the annular space 36 between the tank sections. An annular slide valve 71 is provided in the annular space 36 which is of H-shape in cross section having an outer peripheral flange 71a adjacent the inner wall 2a, an inner peripheral flange 71b overlying the cylindrical wall of the inner tank section 5c and a web 71c between the flanges dividing the annular space 36 into a separate forward and rearward combustion chamber sections 75 and 76. A piston 77 is located in the combustion chamber section 75 forwardly of the slide valve 71, but its head 78 is located at its forward end and its skirt 79 projects rearwardly from the head at the inner periphery of the combustion chamber.

In this modified construction shear cups 80 and 80a corresponding to the shear cups 18, previously described, close the passages 16 in a rearward pair of rows and the shear cups project into recesses 81 and 81a in the outer peripheral flange 71a. Shear cups 82 and 82a close passages 16 in a forward pair of rows and project into annular grooves 83 and 83a in the outer flange 71a which are of a width to permit longitudinal movement of the slide valve 71 to shear the cups 80 and 80a without shearing the shear cups 82 and 82a. Outer flange 71a has two rows of passages 84 and 84a which will align with the passages 16 in the wall 2b closed by the shear cups 80 and 80a upon a predetermined increment of movement and then close the orifices upon a further corresponding increment of movement. Rows of passages 85 and 85a also are provided in the flange 71a which are offset forwardly a greater distance from the shear cups 82 and 82a so that the slide valve 71 must be moved an additional increment of movement to align these passages with the other rows of passages 16 in the wall 2b.

The inner tank section 5c has sealing shear cups 70 and 70a projecting into recesses 81b and 81c in the inner flange 71b of the slide valve 71 and sealing shear cups 70b and 70c projecting into recesses 83c and 83d. The inner flange 71b of the slide valve also has passages 84b and 84c and 85b and 85c, the same as passages 84, 84a and 85, 85a in the outer flange 71a, for successive alignment with the rows of passages 70, 70a and 70b, 70c, respectively. Thus, upon a predetermined increment of movement of the slide valve 71 the shear cups 70, 70a and 80, 80a are sheared and deliver liquid oxidizer and propellant through the passages 84, 84a and 84b, 84c of the slide valve 71 and into the rearward section of the combustion chamber 76.

The first increment of rearward movement of the slide valve 71 is controlled by a rod 86 having an end projecting into a recess 87 in the outer flange 71a of the slide valve. Thus, as the slide valve 71 is moved rearwardly the forward shoulder 88 of the recess 87 engages the end of the rod to limit further rearward movement. Control rod 86 is mounted for actuation to withdraw its end from the recess 87 by a motor 89 which may be electrically actuated and controlled from a signal. When the motor 89 is energized it withdraws the rod 86 to permit an additional increment of rearward movement of the slide valve 71 to shear cups 70b, 70c and 82, 82a and align the forward two rows of passages 16 in the wall 2b of tank section 5b with passages 85 and 85a and the forward two rows of passages 44 in the tank section 5c with passages 85b and 85c in the inner slide valve flange 71b.

When the solid propellant grain 8 is ignited, the products of combustion under pressure flow through the orifices 17 and 20 to pressurize the tank sections 5a and 5b in the manner as previously explained with respect to the form of construction illustrated in FIGURES 1 to 7. The gases also flow through the conduit 64 into the chamber 61 at the forward end of the piston 77 to actuate the piston from the position illustrated in FIGURE 8 to that illustrated in FIGURE 9. As the rearward end of the piston 77 engages the end of the inner flange 71b of the slide valve 71 it moves the slide valve from the position illustrated in FIGURE 8 to that shown in FIGURE 9 and this movement is limited by the engagement of the annular shoulder 88 at the end of the recess 87 with the depending end of the control rod 86. Such movement of the slide valve 71 shears the cups 80, 80a and 70, 70a and aligns the orifices 16 and 44 with the passages 84, 84a and 84b, 84c, respectively, to supply liquid oxidizer and fuel to the rearward section 76 of the combustion chamber formed by the transverse web 71c of the slide valve 71. The burning of the fuel in the oxidizer produces a pressure and the release of this pressure through the nozzle 15 at the rearward side of the combustion chamber produces a forward thrust for propelling the rocket engine.

The forward movement of the rocket engine continues until a signal operates the responsive device 89 to withdraw the control rod 86 from the recess 87 in the slide valve 71. Upon release of the slide valve 71, the piston 77 then actuates the slide valve 71 rearwardly through another increment of movement from the position illustrated in FIGURE 9 to that illustrated in FIGURE 10. Such rearward movement of the slide valve 71 is limited by the engagement of the outer flange 71a of the slide valve 71 with the annular stop shoulder 90. During such rearward movement the passages 84, 84a and 84b, 84c are moved out of alignment with the orifices 16 and 44 which prevent the further flow of liquid fuel and oxidizer into the rearward section 76 of the combustion chamber. However, during such rearward movement the forward two rows of sealing cups 82, 82a in the tank section 5b and 70b, 70c of tank section 5c are sheared to align the inner two rows of passages 85, 85a and 85b, 85c the slide valve with passages 16 in the wall 2b of tank section 5b and passages 44 in the wall of inner tank section 5c to deliver liquid fuel and oxidizer into the forward section 75 of the combustion chamber which then escapes through the reverse nozzles 30, see FIGURE 10, to produce a rearward component of force on the rocket engine to cause it to decelerate.

It will now be observed that the present invention provides an improved control mechanism operable in response to a signal for directing products of combustion from a combustion chamber through reverse thrust nozzles to produce deceleration. It will also be observed that the present invention utilizes the products of combustion in a rocket engine for actuating a control valve mechanism for reversing the thrust thereon. It will still further be observed that the present invention provides an apparatus for controlling the flow of combustion gas through separate forward and reverse thrust nozzles which is of simple and compact construction and relatively economical to manufacture.

While two embodiments of the invention are herein illustrated and described, it will be understood that further changes may be made in the construction and arrangement of elements without departing from the spirit or scope of the invention. Therefore, without limitation in this respect, the invention is defined by the following claims.

What is claimed is:

1. A rocket engine having a casing with tanks for liquid fuel and oxidizer and forming axial openings adjacent opposite ends of the casing, a grain of solid fuel in said axial opening adjacent the forward end, a combustion chamber in said axial opening adjacent the rearward end, a main nozzle at the rearward end of the combustion chamber, means for igniting said grain of solid fuel to produce a gas under pressure, means actuated by the gas produced from said solid fuel grain comprising a slide valve having ports therein for connection with passages from said tanks to deliver liquid fuel and oxidizer to said combustion chamber, at least one reverse thrust nozzle projecting forwardly in the engine, and means operable in response to a signal to actuate at least a portion of said slide through another increment of movement to direct the products of combustion from said liquid fuel and oxidizer through the reverse thrust nozzle.

2. A rocket engine in accordance with claim 1 in which the means operable in response to a signal is a valve for relieving pressure on one side of the slide, said slide overlying the reverse thrust nozzle in one position and movable to another position by the pressure in the combustion chamber to open the reverse thrust nozzle.

3. A rocket engine in accordance with claim 1 in which one of the tanks is of annular form to provide said axial opening, another of said tanks is of cylindrical form and of smaller diameter than the diameter of the axial opening and located centrally in said opening to provide an annular space therebetween, passages in said tanks sealed by shear cups, the shear cups for at least one tank projecting into the annular space, the slide valve actuated by the gas produced from said solid fuel being located in the annular space between the inner and outer tanks and having sharp edges for shearing the cups to open passages through which the liquid flows into the annular space through the ports in the slide valve.

4. A rocket engine in accordance with claim 3 in which the slide valve actuated by the gas produced from said solid propellant comprises a piston in the centrally located tank, shear cups for sealing the passages projecting into the tank, sharp edges on the piston for shearing the cups, and passages in said piston aligning with the passages in said tank to deliver liquid radially into the annular space between said tanks.

5. A rocket engine in accordance with claim 1 in which the slide valve actuated by the gas produced from said solid fuel for opening passages from said tanks comprises separate parts including a slide and a piston, said gas from the solid propellant actuating the piston and slide in one direction as a unit, means for limiting the movement of the piston and slide in said one direction to cover the reverse thrust nozzle, and means for producing a difference in pressure acting on said piston for moving it in the opposite direction relative to the slide to uncover the reverse thrust nozzle.

6. A rocket engine in accordance with claim 5 in which the means for producing a difference in pressure is an exhaust passage at the side of the piston opposite the combustion chamber, and a valve in the exhaust passage for releasing the pressure at said side of the piston.

7. A rocket engine in accordance with claim 1 in which the slide valve actuated by the gas produced from said grain of solid fuel has a radial wall dividing the combustion chamber into separate sections, the rearward section of the combustion chamber being connected to the main nozzle, the forward section of the combustion chamber being connected to the reverse thrust nozzle, and said slide valve controlling the flow of liquid fuel and oxidizer to the respective sections of the combustion chambers.

8. A rocket engine in accordance with claim 7 in which one of said tanks is of annular form to provide an axial opening, another of said tanks being of smaller diameter than the diameter of the axial opening and located centrally thereof to provide an annular space therebetween, shear cups for sealing the inner and outer tanks and projecting into the annular space, said slide valve shearing certain cups when actuated through one increment of movement to supply liquid fuel and oxidizer to the rearward section of the combustion chamber, and said slide valve shearing other cups when moved through another increment of movement to supply liquid fuel and oxidizer to the forward section of said combustion chamber.

9. A rocket engine in accordance with claim 8 in which a stop means is provided for limiting the rearward movement of the slide valve through its first increment, said stop means being a locking detent projecting into a recess in the slide valve, and the means operable in response to a signal is an electrically energized element for withdrawing the locking detent.

10. A rocket engine in accordance with claim 9 in which the slide valve has edges for shearing certain of the cups on the inner and outer tanks, passages in said slide valve for delivering liquid fuel and oxidizer through said passages closed by the sheer cups to the rearward section of the combustion chamber, said slide valve having edges for shearing additional cups when actuated through its other increment of movement to open additional passages from the tanks and through the slide valve for directing liquid fuel and oxidizer into the forward section of the combustion chamber, said slide valve in said latter position closing the first mentioned passages to the rearward section of the combustion chamber, and a second stop means for limiting the movement of the slide valve after its second increment of movement.

References Cited
UNITED STATES PATENTS

| | | | |
|---|---|---|---|
| 2,940,256 | 6/1960 | Conyers et al. | 60—39.48 |
| 3,038,303 | 6/1962 | Gose | 60—229 |
| 3,094,837 | 6/1963 | Sherman et al. | 60—39.48 X |
| 3,097,482 | 7/1963 | Lovingham | 60—258 |
| 3,177,655 | 4/1965 | White | 60—229 X |
| 3,185,069 | 5/1965 | Daudelin | 60—229 X |

CARLTON R. CROYLE, *Primary Examiner.*